(12) United States Patent
Tsutsumi et al.

(10) Patent No.: US 10,646,934 B2
(45) Date of Patent: May 12, 2020

(54) DRILL

(71) Applicant: SUMITOMO ELECTRIC HARDMETAL CORP., Itami-shi (JP)

(72) Inventors: Yuki Tsutsumi, Itami (JP); Masaaki Jindai, Itami (JP); Hirofumi Tamanishi, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/318,285

(22) PCT Filed: Jul. 6, 2018

(86) PCT No.: PCT/JP2018/025685
§ 371 (c)(1),
(2) Date: Jan. 16, 2019

(87) PCT Pub. No.: WO2019/021785
PCT Pub. Date: Jan. 31, 2019

(65) Prior Publication Data
US 2019/0232392 A1    Aug. 1, 2019

(30) Foreign Application Priority Data

Jul. 27, 2017   (WO) ............... PCT/JP2017/027299

(51) Int. Cl.
*B23B 51/02* (2006.01)
*B23B 51/00* (2006.01)

(52) U.S. Cl.
CPC ............ *B23B 51/02* (2013.01); *B23B 51/00* (2013.01); *B23B 2251/08* (2013.01); *B23B 2251/12* (2013.01); *B23B 2251/14* (2013.01)

(58) Field of Classification Search
CPC . B23B 51/02; B23B 2251/08; B23B 2251/12; B23B 2251/14
See application file for complete search history.

(56) References Cited

U.S. PATENT DOCUMENTS 6,585,460 B1 * 7/2003 Meece ................ B23B 51/02
                                                           408/227
10,155,269 B2 * 12/2018 Jindai ................. C23C 14/06
(Continued)

FOREIGN PATENT DOCUMENTS

JP     2014193513 A  * 10/2014
JP     2015131384 A  *  7/2015
(Continued)

*Primary Examiner* — Eric A. Gates
(74) *Attorney, Agent, or Firm* — Baker Botts L.L.P.; Michael A. Sartori

(57) ABSTRACT

The negative land includes: a first region in which a space between the upper cutting edge and the lower cutting edge becomes wider toward the outer circumferential surface; and a second region which is continuous to the first region and in which the space becomes wider toward the rotation axis. In a cross section perpendicular to the rotation axis, the rake face includes a return face continuous to the outer circumferential surface, the return face being recessed opposite to a rotation direction of the drill. When a first boundary represents a boundary between the outer circumferential surface and the first region and a second boundary represents a boundary between the first region and the second region, a length of the first boundary is larger than a length of the second boundary in a direction parallel to the rotation axis. The second boundary is continuous to the return face.

15 Claims, 6 Drawing Sheets

(56) References Cited

U.S. PATENT DOCUMENTS

2010/0322728 A1\* 12/2010 Aare ................ B23B 51/02
　　　　　　　　　　　　　　　　　　　408/200
2014/0219737 A1　 8/2014　Takai et al.
2014/0294529 A1　10/2014　Takai

FOREIGN PATENT DOCUMENTS

| JP | 2017087406 A | \* | 5/2017 |
| JP | 2017-124475 A | | 7/2017 |
| WO | 2013/035166 A1 | | 3/2013 |
| WO | 2013/065201 A1 | | 5/2013 |
| WO | 2015/194408 A1 | | 12/2015 |

\* cited by examiner

DRILL

The present invention relates to a drill. The present application claims a priority based on International Patent Application No. PCT/JP2017/027299 filed on Jul. 27, 2017, the entire content of which is incorporated herein by reference.

TECHNICAL FIELD

Background Art

Each of WO 2013/065201 (Patent Literature 1) and WO 2013/035166 (Patent Literature 2) discloses a drill having a cutting edge. The cutting edge has: a recessed, curved cutting edge portion formed at the inner circumferential side; and a protruding, curved cutting edge portion formed at the outer circumferential side.

CITATION LIST

Patent Literature

PTL 1: WO 2013/065201
PTL 2: WO 2013/035166

SUMMARY OF INVENTION

A drill according to one embodiment of the present invention includes a rake face, a negative land, a flank face, and an outer circumferential surface. The negative land is continuous to the rake face. The flank face is continuous to the negative land. The outer circumferential surface is continuous to the rake face, the negative land, and the flank face. A ridgeline between the rake face and the negative land constitutes a lower cutting edge. A ridgeline between the flank face and the negative land constitutes an upper cutting edge. When viewed in a direction along a rotation axis of the drill, the negative land includes: a first region in which a space between the upper cutting edge and the lower cutting edge becomes wider toward the outer circumferential surface; and a second region which is continuous to the first region and in which the space becomes wider toward the rotation axis. In a cross section perpendicular to the rotation axis, the rake face includes a return face continuous to the outer circumferential surface, the return face being recessed opposite to a rotation direction of the drill. When a first boundary represents a boundary between the outer circumferential surface and the first region and a second boundary represents a boundary between the first region and the second region, a length of the first boundary is larger than a length of the second boundary in a direction parallel to the rotation axis. The second boundary is continuous to the return face.

DETAILED DESCRIPTION

Figure 1:
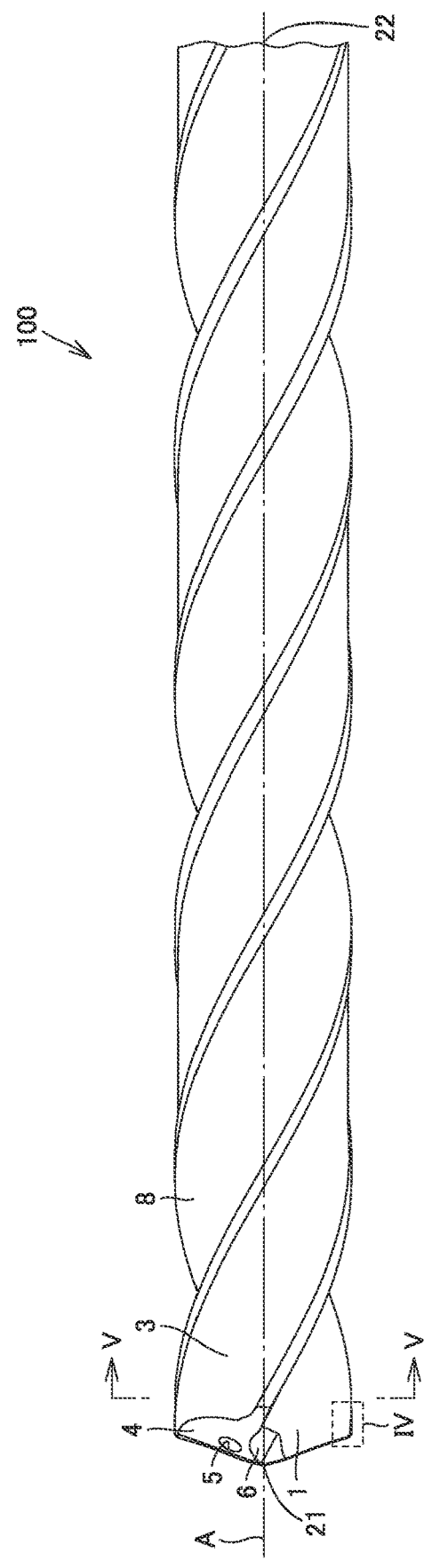
FIG. 1 is a schematic plan view showing a configuration of a drill according to the present embodiment.

Problem to be Solved by the Present Disclosure

In the drill described in each of WO 2013/065201 and WO 2013/035166, chipping is likely to occur in the cutting edge. Hence, it cannot be said that durability of the cutting edge is sufficiently high. Moreover, a cut surface is work-hardened, with the result that it becomes difficult to subsequently perform a tap process and a reamer process, disadvantageously.

An object of one embodiment of the present invention is to provide a drill, by which durability of a cutting edge can be improved and a cut surface can be prevented from being work-hardened.

Advantageous Effect of the Present Disclosure

According to one embodiment of the present invention, there can be provided a drill, by which durability of a cutting edge can be improved and a cut surface can be prevented from being work-hardened.

DESCRIPTION OF EMBODIMENTS

First, the following describes a summary of an embodiment of the present invention.

(1) A drill 100 according to one embodiment of the present invention includes a rake face 1, a negative land 13, a flank face 2, and an outer circumferential surface 3. Negative land 13 is continuous to rake face 1. Flank face 2 is continuous to negative land 13. Outer circumferential surface 3 is continuous to rake face 1, negative land 13, and flank face 2. A ridgeline between rake face 1 and negative land 13 constitutes a lower cutting edge 11. A ridgeline between flank face 2 and negative land 13 constitutes an upper cutting edge 12. When viewed in a direction along a rotation axis of the drill, negative land 13 includes: a first region 13a1 in which a space between upper cutting edge 12 and lower cutting edge 11 becomes wider toward outer circumferential surface 3; and a second region 13a2 which is continuous to first region 13a1 and in which the space becomes wider toward rotation axis A. In a cross section perpendicular to rotation axis A, rake face 1 includes a return face 1a continuous to outer circumferential surface 3, return face 1a being recessed opposite to a rotation direction R of the drill. When a first boundary 31 represents a boundary between outer circumferential surface 3 and first region 13a1 and a second boundary 32 represents a boundary between first region 13a1 and second region 13a2, a length L1 of first boundary 31 is larger than a length L2 of second boundary 32 in a direction parallel to rotation axis A. Second boundary 32 is continuous to return face 1a.

According to drill 100 according to (1), when viewed in the direction along rotation axis A of the drill, negative land 13 includes: first region 13a1 in which the space between upper cutting edge 12 and lower cutting edge 11 becomes wider toward outer circumferential surface 3; and second region 13a2 which is continuous to first region 13a1 and in which the space becomes wider toward rotation axis A. That is, negative land 13 is recessed opposite to rotation direction R of the drill. This leads to increased strength of negative land 13, whereby the cutting edge can be suppressed from being chipped readily. As a result, durability of the cutting edge can be improved. Moreover, in the cross section perpendicular to rotation axis A, return face 1a continuous to outer circumferential surface 3 is recessed opposite to rotation direction R of the drill. Accordingly, as compared with a case where return face 1a protrude in rotation direction R of the drill, an internal surface of a workpiece can be suppressed from being work-hardened while improving sharpness. Furthermore, second boundary 32 is continuous to return face 1a. Accordingly, when cutting, for example, a steel such as S50C, the cutting edge can be suppressed from being chipped at the outer circumferential portion thereof.

(2) In drill 100 according to (1), negative land 13 may include: a third region 13b which is continuous to second region 13a2 and in which the space becomes narrower toward rotation axis A of drill 100 in the direction parallel to rotation axis A; and a fourth region 13c continuous to third region 13b and continuous to a thinning face 6. That is, a length L3 of third boundary 33 is larger than a length L5 of a line segment 35. Accordingly, chipping of the cutting edge, which is likely to occur when cutting, for example, an alloy steel such as SCM415, can be suppressed.

(3) In drill 100 according to (2), upper cutting edge 12 may have a first upper cutting edge portion 12a continuous to outer circumferential surface 3 and protruding in rotation direction R. This leads to increased strength of first upper cutting edge portion 12a, whereby the cutting edge can be suppressed from being chipped readily. As a result, durability of the cutting edge can be improved.

(4) In drill 100 according to (3), when viewed in the direction along rotation axis A, first upper cutting edge portion 12a may have a curvature.

(5) In drill 100 according to (4), when viewed in the direction along rotation axis A, a curvature radius of first upper cutting edge portion 12a may be 0.5 time or less as large as a diameter of the drill.

(6) In drill 100 according to any one of (3) to (5), upper cutting edge 12 may have a second upper cutting edge portion 12b continuous to first upper cutting edge portion 12a and recessed opposite to rotation direction R. Accordingly, rake face 1 can be suppressed from being worn.

(7) In drill 100 according to (6), when viewed in the direction along rotation axis A, second upper cutting edge portion 12b may have a curvature.

(8) In drill 100 according to (6) or (7), upper cutting edge 12 may have a third upper cutting edge portion 12c continuous to second upper cutting edge portion 12b and fourth region 13c and protruding in rotation direction R. Accordingly, rake face 1 can be suppressed from being worn.

(9) In drill 100 according to (8), when viewed in the direction along rotation axis A, third upper cutting edge portion 12c may have a curvature.

(10) In drill 100 according to (9), when viewed in the direction along rotation axis A, a curvature radius of third upper cutting edge portion 12c may be 0.2 time or more and 0.35 time or less as large as a diameter D of drill 100.

(11) In drill 100 according to any one of (8) to (10), when viewed in the direction along rotation axis A, a curvature radius of second upper cutting edge portion 12b may be 1.2 times or more and 1.6 times or less as large as a curvature radius of third upper cutting edge portion 12c.

(12) In drill 100 according to any one of (1) to (11), in the cross section, a curvature radius of return face 1a may be 0.2 time or more and 0.4 time or less as large as a diameter D of the drill.

(13) In drill 100 according to (2), when a third boundary 33 represents a boundary between second region 13a2 and third region 13b, a length L3 of third boundary 33 may be larger than a length L2 of second boundary 32 in the direction parallel to rotation axis A. Accordingly, sharpness of return portion 1b can be improved.

(14) In drill 100 according to any one of (1) to (13), lower cutting edge 11 may have a first lower cutting edge portion 11a continuous to outer circumferential surface 3 and protruding in rotation direction R.

(15) In drill 100 according to (13), rake face 1 may have a rake face portion 1b continuous to return face 1a. Third boundary 33 may be continuous to a fourth boundary 34, which represents a boundary between return face 1a and rake face portion 1b.

Details of Embodiment of the Present Invention

The following describes details of an embodiment (hereinafter, referred to as "the present embodiment") of the present invention based on figures. It should be noted that in the below-described figures, the same or corresponding portions are given the same reference characters and are not described repeatedly.

Figure 2:
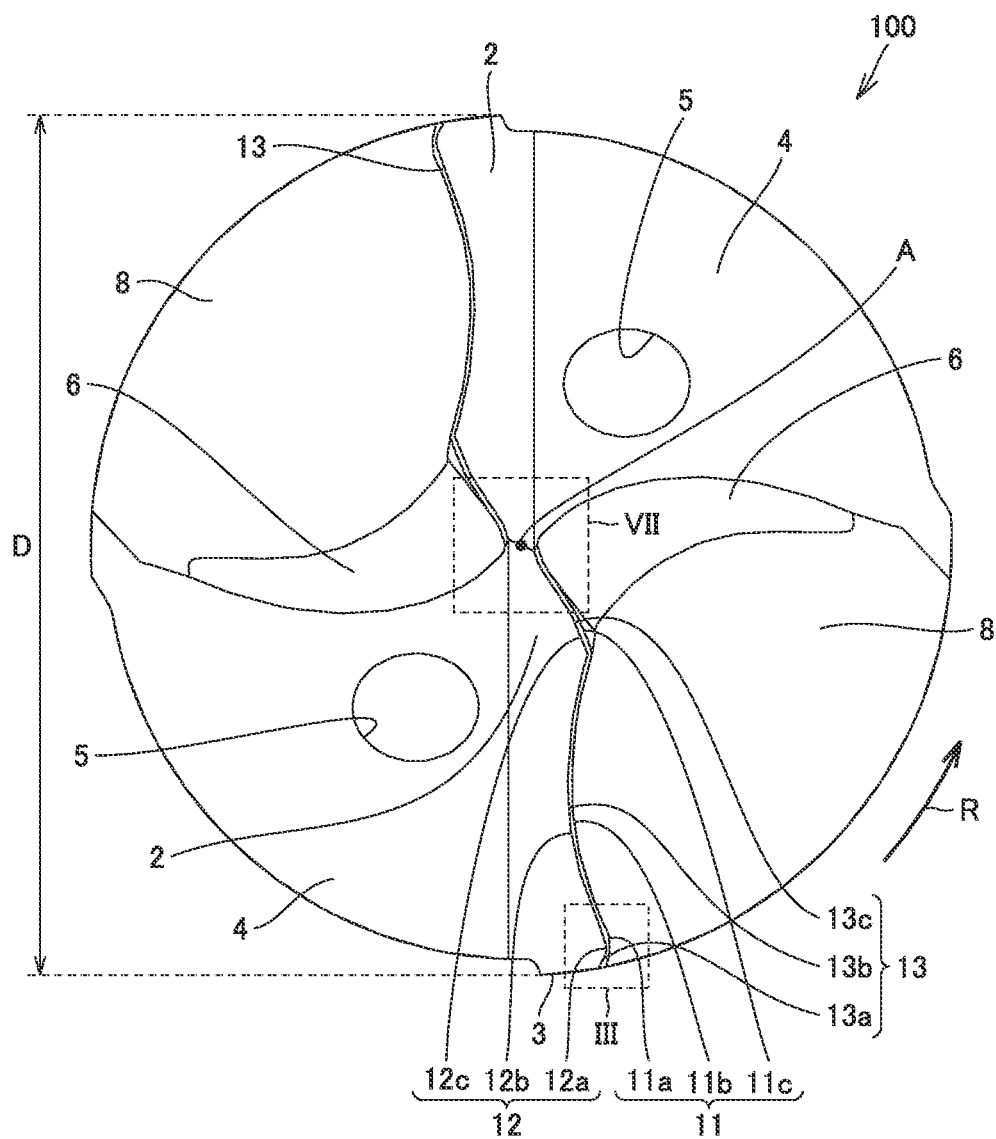
FIG. 2 is a schematic front view showing the configuration of the drill according to the present embodiment.

As shown in FIG. 1 and FIG. 2, a drill 100 according to the present embodiment has a rake face 1, a negative land 13, a flank face 2, an outer circumferential surface 3, a lubricant supply hole 5, a thinning face 6, an inclined surface 4, and a flute portion 8. Negative land 13 is continuous to rake face 1. Flank face 2 is continuous to negative land 13. Negative land 13 is sandwiched between rake face 1 and flank face 2. Outer circumferential surface 3 is continuous to rake face 1, negative land 13, and flank face 2. A ridgeline between rake face 1 and negative land 13 constitutes a lower cutting edge 11. A ridgeline between flank face 2 and negative land 13 constitutes an upper cutting edge 12. The number of negative lands 13 is not limited particularly as long as one or more negative lands 13 are provided. For example, two negative lands 13 are provided. As shown in FIG. 2, the pair of negative lands 13 are located at locations in point symmetry with respect to a rotation axis A, for example.

Drill 100 is configured to be rotatable around rotation axis A. Rotation axis A extends from a tip 21 of drill 100 toward a back end side 22 thereof. At back end side 22 of drill 100, a shank (not shown) may be provided. Flute portion 8 is provided to have a helical shape around rotation axis A. The outer edge of flute portion 8 includes rake face 1. Inclined surface 4 is disposed at the backside relative to flank face 2 in rotation direction R. Inclined surface 4 is continuous to flank face 2. Inclined surface 4 is inclined relative to flank face 2. It should be noted that FIG. 2 is a diagram when viewed in a direction along rotation axis A of the drill.

Thinning face 6 is disposed at the back side relative to inclined surface 4 in rotation direction R. Thinning face 6 is provided opposite to outer circumferential surface 3 relative to flank face 2. Thinning face 6 is continuous to inclined surface 4. Thinning face 6 is located at the back end side 22 side relative to inclined surface 4. Lubricant supply hole 5 is provided in inclined surface 4, for example. Lubricant supply hole 5 may extend through the shank and may open at back end side 22.

Figure 3:
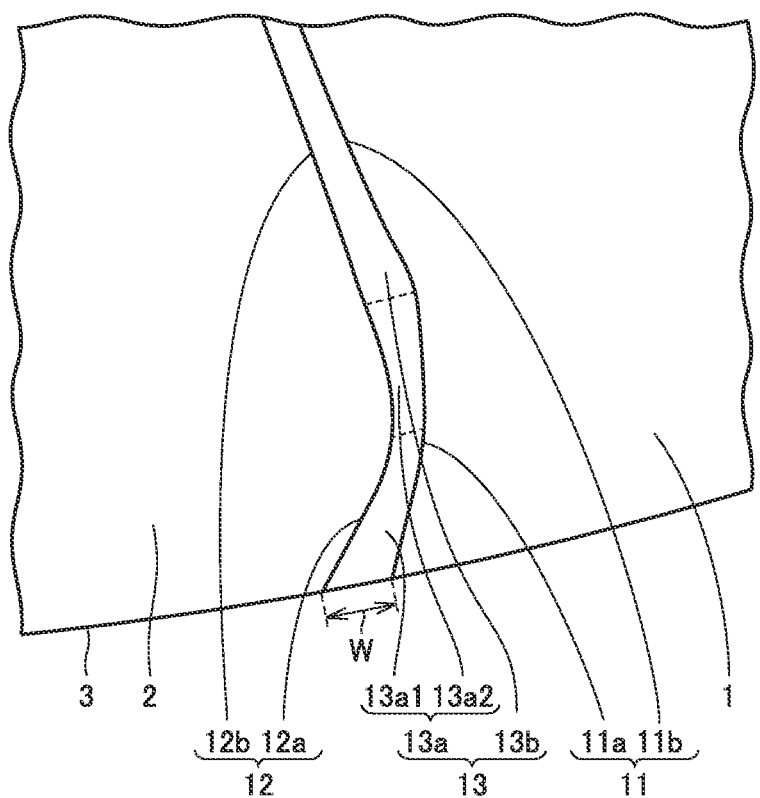
FIG. 3 is an enlarged schematic view of a region III of FIG. 2.
Figure 4:
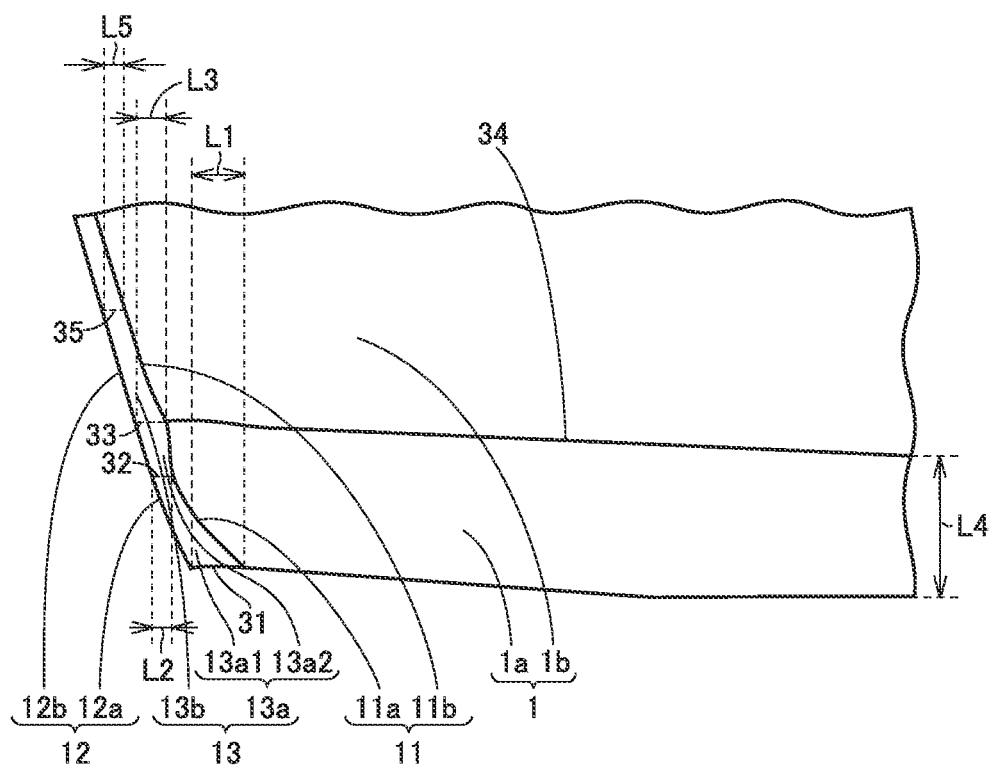
FIG. 4 is an enlarged schematic view of a region IV of FIG. 1.

As shown in FIG. 3 and FIG. 4, negative land 13 includes a first negative land portion 13a, a second negative land portion 13b (third region 13b), and a third negative land portion 13c (fourth region 13c) (see FIG. 7), for example. First negative land portion 13a has a first region 13a1 and a second region 13a2. First region 13a1 is continuous to outer circumferential surface 3. As shown in FIG. 3, when viewed in the direction along rotation axis A of drill 100, in first region 13a1, a space W between upper cutting edge 12 and lower cutting edge 11 becomes wider toward outer circumferential surface 3. Space W between upper cutting edge 12 and lower cutting edge 11 is a circumferential length of a circle centered on rotation axis A, for example. Second region 13a2 is continuous to first region 13a1. Second region 13a2 is located at the rotation axis A side relative to first region 13a1. In second region 13a2, the space between upper cutting edge 12 and lower cutting edge 11 becomes wider toward rotation axis A.

Second negative land portion 13b is continuous to first negative land portion 13a. Second negative land portion 13b is located at the rotation axis A side relative to first negative land portion 13a. Third negative land portion 13c is continuous to second negative land portion 13b. Third negative land portion 13c is located at the rotation axis A side relative to second negative land portion 13b. Second negative land portion 13b is located between first negative land portion 13a and third negative land portion 13c. Second negative land portion 13b is continuous to second region 13a2. As shown in FIG. 3, when viewed in the direction along rotation axis A of drill 100, in second negative land portion 13b, the space between upper cutting edge 12 and lower cutting edge 11 may become narrower toward rotation axis A.

As shown in FIG. 2, upper cutting edge 12 has a first upper cutting edge portion 12a, a second upper cutting edge portion 12b, and a third upper cutting edge portion 12c, for example. First upper cutting edge portion 12a is continuous to outer circumferential surface 3. First upper cutting edge portion 12a is constituted of first negative land portion 13a. First upper cutting edge portion 12a protrudes in rotation direction R, for example. A boundary between first region 13a1 and second region 13a2 is located in the vicinity of a top of the protrusion of first upper cutting edge portion 12a in the rotation direction. As shown in FIG. 2, when viewed in the direction along rotation axis A, first upper cutting edge portion 12a may have a curvature. When viewed in the direction along rotation axis A, the curvature radius of first upper cutting edge portion 12a is 0.5 time or less as large as diameter D of drill 100, for example. When viewed in the direction along rotation axis A, the curvature radius of first upper cutting edge portion 12a may be 0.4 time or less or 0.25 time or less as large as diameter D of drill 100.

Second upper cutting edge portion 12b is continuous to first upper cutting edge portion 12a. Second upper cutting edge portion 12b is constituted of second negative land portion 13b. Second upper cutting edge portion 12b is recessed opposite to rotation direction R, for example. When viewed in the direction along rotation axis A, second upper cutting edge portion 12b may have a curvature. The curvature radius of second upper cutting edge portion 12b may be larger than the curvature radius of first upper cutting edge portion 12a. Second upper cutting edge portion 12b is located at the rotation axis A side relative to first upper cutting edge portion 12a.

Third upper cutting edge portion 12c is continuous to second upper cutting edge portion 12b. Third upper cutting edge portion 12c is constituted of third negative land portion 13c. Third upper cutting edge portion 12c is located at the rotation axis A side relative to second upper cutting edge portion 12b. Second upper cutting edge portion 12b is located between first upper cutting edge portion 12a and third upper cutting edge portion 12c. Third upper cutting edge portion 12c protrudes in rotation direction R, for example. When viewed in the direction along rotation axis A, third upper cutting edge portion 12c may have a curvature.

When viewed in the direction along rotation axis A, the curvature radius of third upper cutting edge portion 12c is 0.2 time or more and 0.35 time or less as large as diameter D of the drill, for example. When viewed in the direction along rotation axis A, the curvature radius of third upper cutting edge portion 12c is 0.22 time or more or 0.24 time or more as large as diameter D of the drill. When viewed in the direction along rotation axis A, the curvature radius of third upper cutting edge portion 12c may be 0.33 time or less or 0.30 time or less as large as diameter D of the drill. When viewed in the direction along rotation axis A, the curvature radius of second upper cutting edge portion 12b is 1.2 times or more and 1.6 times or less as large as the curvature radius of third upper cutting edge portion 12c, for example. When viewed in the direction along rotation axis A, the curvature radius of second upper cutting edge portion 12b may be 1.25 times or more or 1.3 times or more as large as the curvature radius of third upper cutting edge portion 12c. When viewed in the direction along rotation axis A, the curvature radius of second upper cutting edge portion 12b may be 1.55 times or less or 1.5 times or less as large as the curvature radius of third upper cutting edge portion 12c.

Lower cutting edge 11 has a first lower cutting edge portion 11a, a second lower cutting edge portion 11b, and a third lower cutting edge portion 11c, for example. First lower cutting edge portion 1a is continuous to outer circumferential surface 3. First lower cutting edge portion 11a is constituted of first negative land portion 13a. First lower cutting edge portion 11a protrudes in rotation direction R, for example. When viewed in the direction along rotation axis A, first lower cutting edge portion 11a may have a curvature.

Second lower cutting edge portion 11b is continuous to first lower cutting edge portion 11a. Second lower cutting edge portion 11b is constituted of second negative land portion 13b. Second lower cutting edge portion 11b is recessed opposite to rotation direction R, for example. When viewed in the direction along rotation axis A, second lower cutting edge portion 11b may have a curvature. The curvature radius of second lower cutting edge portion 11b may be larger than the curvature radius of first lower cutting edge portion 11a. Second lower cutting edge portion 11b is located at the rotation axis A side relative to first lower cutting edge portion 11a.

Third lower cutting edge portion 11c is continuous to second lower cutting edge portion 11b. Third lower cutting edge portion 11c is constituted of third negative land portion 13c. Third lower cutting edge portion 11c is located at the rotation axis A side relative to second lower cutting edge portion 11b. Second lower cutting edge portion 11b is located between first lower cutting edge portion 11a and third lower cutting edge portion 11c. Third lower cutting edge portion 11c protrudes in rotation direction R, for example. When viewed in the direction along rotation axis A, third lower cutting edge portion 11c may have a curvature.

As shown in FIG. 4, rake face 1 has a return face 1a and a rake face portion 1b. Return face 1a is continuous to first region 13a1 and rake face portion 1b. Return face 1a may be inclined relative to first region 13*a*1. Return face 1*a* may be inclined relative to rake face portion 1*b*. As shown in FIG. 4, when viewed in the direction perpendicular to rotation axis A, the width of first region 13*a*1 (space between first upper cutting edge portion 12*a* and first lower cutting edge portion 11*a*) may become wider from rotation axis A toward outer circumferential surface 3. When viewed in the direction perpendicular to rotation axis A, in second region 13*a*2, the space between first upper cutting edge portion 12*a* and first lower cutting edge portion 11*a* may become wider from outer circumferential surface 3 toward rotation axis A. When viewed in the direction perpendicular to rotation axis A, in second negative land portion 13*b*, the space between second upper cutting edge portion 12*b* and second lower cutting edge portion 11*b* may become narrower toward rotation axis A.

As shown in FIG. 4, when a first boundary 31 represents a boundary between outer circumferential surface 3 and first region 13*a*1 and a second boundary 32 represents a boundary between first region 13*a*1 and second region 13*a*2, length L1 of first boundary 31 is larger than length L2 of second boundary 32 in the direction parallel to rotation axis A. When a third boundary 33 represents a boundary between second region 13*a*2 and third region 13*b*, length L2 of second boundary 32 is smaller than length L3 of third boundary 33 in the direction parallel to rotation axis A. Length L1 of first boundary 31 may be more than or equal to length L3 of third boundary 33 in the direction parallel to rotation axis A. Length L1 of first boundary 31 is 0.01 time or more and 0.03 time or less as large as diameter D of drill 100, for example.

Figure 5:
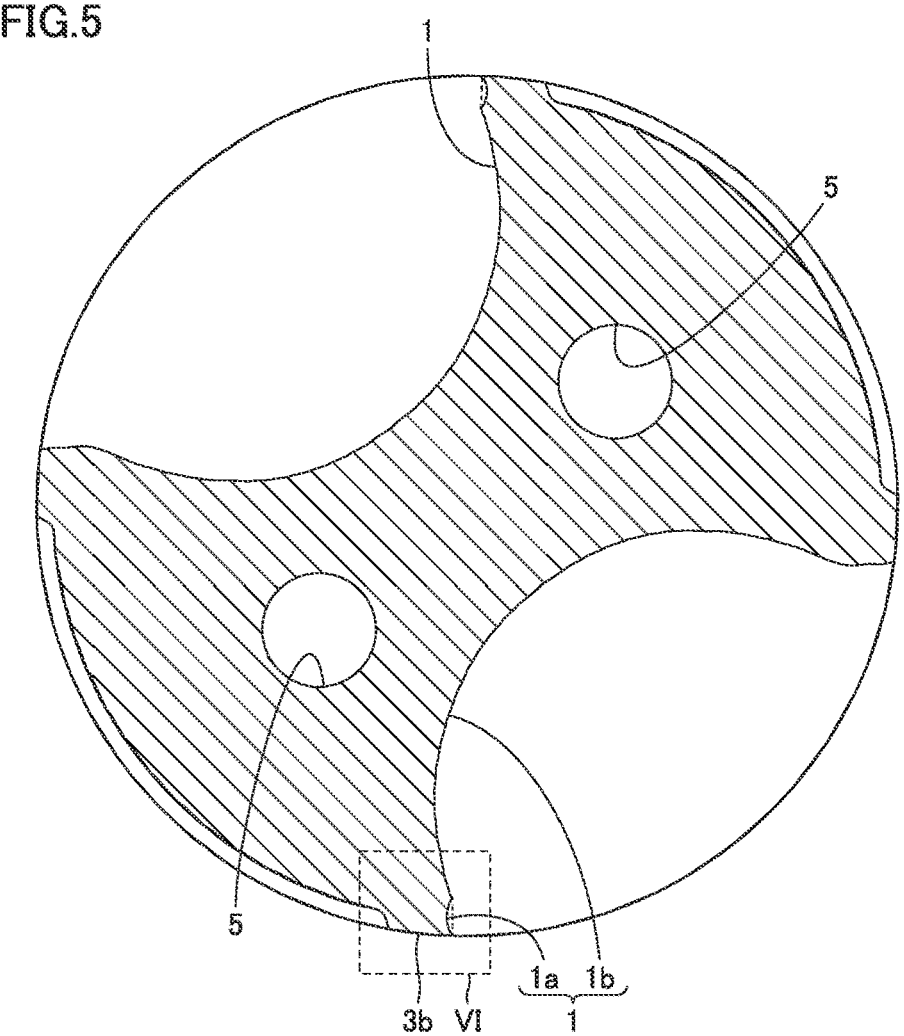
FIG. 5 is a schematic cross sectional view along a V-V line of FIG. 1.

As shown in FIG. 5, in the cross section perpendicular to rotation axis A, rake face 1 has return face 1*a* and rake face portion 1*b*. Return face 1*a* is continuous to outer circumferential surface 3. Rake face portion 1*b* is continuous to return face 1*a*. Rake face portion 1*b* has a curvature. Return face 1*a* is located between outer circumferential surface 3 and rake face portion 1*b*. Rake face portion 1*b* may be a portion of an arc. Outer circumferential surface 3 may have a margin 3*b*.

As shown in FIG. 4, when a fourth boundary 34 represents a boundary between return face 1*a* and rake face portion 1*b*, third boundary 33 may be provided along fourth boundary 34. As shown in FIG. 4, when viewed in a direction perpendicular to a plane including first boundary 31 and fourth boundary 34, width L4 of return face 1*a* is 0.03 time or more and 0.1 time or less as large as diameter D of drill 100, for example. Width L4 of return face 1*a* is a length between first boundary 31 and fourth boundary 34 in the radial direction of drill 100.

As shown in FIG. 4, second boundary 32 may be continuous to return face 1*a*. From another viewpoint, it is said that second boundary 32 may be located between first boundary 31 and third boundary 33 in the radial direction of drill 100. From still another viewpoint, it is said that second boundary 32 may be located between first boundary 31 and fourth boundary 34 in the radial direction of drill 100. When viewed from third boundary 33, length L5 of a line segment 35 of second negative land portion 13*b* opposite to first boundary 31 may be smaller than length L3 of third boundary 33. In the radial direction of drill 100, third boundary 33 is located at an intermediate location between line segment 35 and first boundary 31. From another viewpoint, the length between line segment 35 and third boundary 33 is the same as the length between third boundary 33 and first boundary 31 in the radial direction of drill 100.

Figure 6:
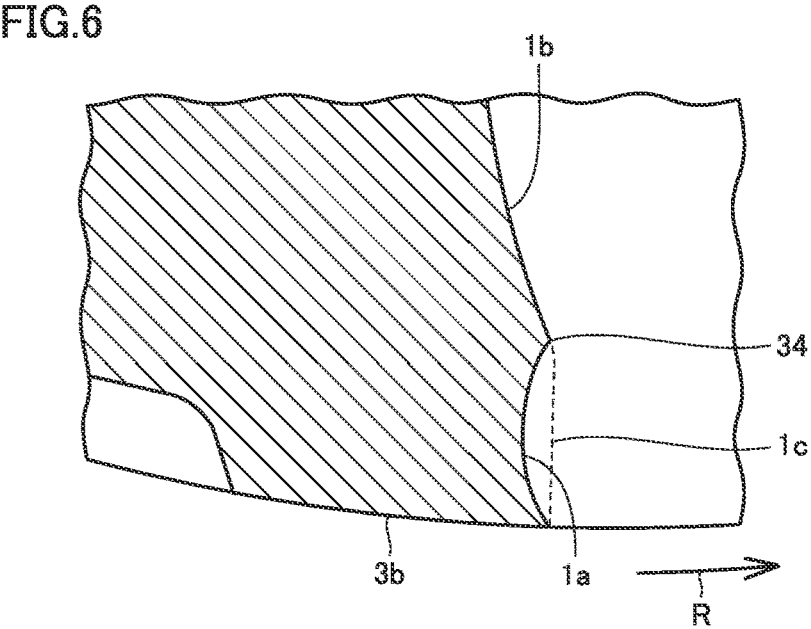
FIG. 6 is an enlarged schematic view of a region VI of FIG. 5.

As shown in FIG. 6, in the cross section perpendicular to rotation axis A, return face 1*a* is recessed opposite to rotation direction R of the drill. Return face 1*a* has a curvature to curve opposite to rotation direction R relative to a straight line 1*c* perpendicular to the outer circumferential surface. Return face 1*a* is continuous to margin 3*b*. As shown in FIG. 1, the cross section is a cross section that is located at a location away from tip 21 toward back end side 22 by about the half of diameter D of the drill and that does not cross negative land 13, for example.

In the cross section perpendicular to rotation axis A, the curvature radius of return face 1*a* is 0.2 time or more and 0.4 time or less as large as diameter D of the drill, for example. In the cross section perpendicular to rotation axis A, the curvature radius of return face 1*a* may be 0.22 time or more or 0.24 time or more as large as diameter D of the drill. In the cross section perpendicular to rotation axis A, the curvature radius of return face 1*a* may be 0.38 time or less or 0.36 time or less as large as diameter D of the drill. The curvature radius (see FIG. 3) of first lower cutting edge portion 11*a* when viewed in the direction along rotation axis A may be larger than the curvature radius (see FIG. 6) of return face 1*a* in the cross section. The curvature radius (see FIG. 3) of first lower cutting edge portion 11*a* when viewed in the direction along rotation axis A is 0.04 time or more and 0.15 time or less as large as diameter D of drill 100, for example.

Figure 7:
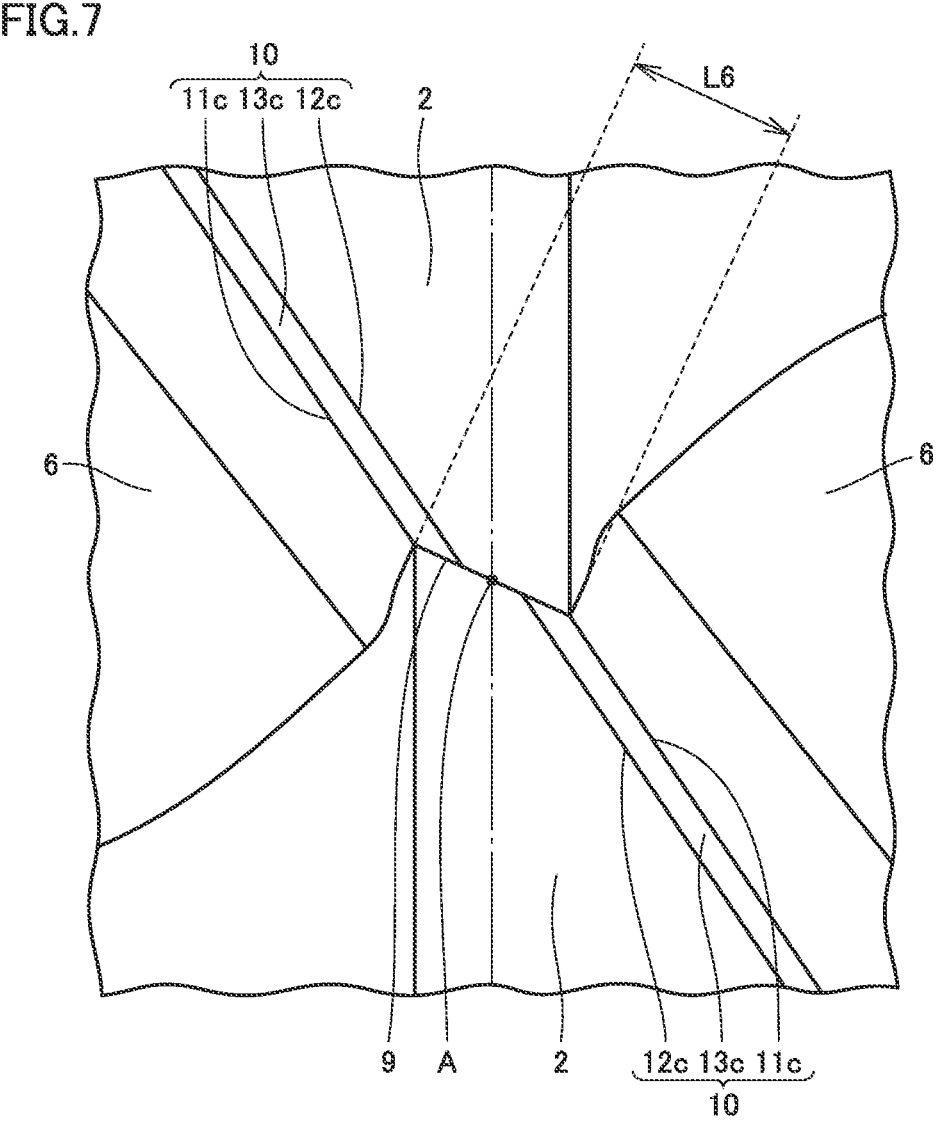
FIG. 7 is an enlarged schematic view of a region VII of FIG. 2.

As shown in FIG. 7, negative land 13 may have a chisel edge 9. Chisel edge 9 is located to cross rotation axis A, for example. Chisel edge 9 is continuous to third upper cutting edge portion 12*c*. Chisel edge 9 is a portion sandwiched between a pair of third upper cutting edge portions 12*c*, for example. A boundary between chisel edge 9 and third upper cutting edge portion 12*c* may be located on a boundary line between flank face 2 and inclined surface 4.

As shown in FIG. 7, when viewed in the direction along rotation axis A, length L6 of chisel edge 9 is 0.10 time or less as large as diameter D of the drill, for example. When viewed in the direction along rotation axis A, the length of chisel edge 9 may be 0.08 time or less or 0.05 time or less as large as diameter D of the drill, for example. When viewed in the direction along rotation axis A, the length of chisel edge 9 is more than or equal to 0.05 mm, for example.

The following describes function and effect of the drill according to the present embodiment.

According to drill 100 according to the present embodiment, when viewed in the direction along rotation axis A of the drill, negative land 13 includes: first region 13*a*1 in which the space between upper cutting edge 12 and lower cutting edge 11 becomes wider toward outer circumferential surface 3; and second region 13*a*2 which is continuous to first region 13*a*1 and in which the space becomes wider toward rotation axis A. That is, negative land 13 is recessed opposite to rotation direction R of the drill. This leads to increased strength of negative land 13, whereby the cutting edge can be suppressed from being chipped readily. As a result, the durability of the cutting edge can be improved. Moreover, in the cross section perpendicular to rotation axis A, return face 1*a* continuous to outer circumferential surface 3 is recessed opposite to rotation direction R of the drill. Accordingly, as compared with a case where return face 1*a* protrudes in rotation direction R of the drill, an internal surface of a workpiece can be suppressed from being work-hardened while improving sharpness. Furthermore, second boundary 32 is continuous to return face 1*a*. Accordingly, when cutting, for example, a steel such as S50C, the cutting edge can be suppressed from being chipped at the outer circumferential portion thereof.

Moreover, according to drill 100 according to the present embodiment, negative land 13 may include: third region 13b which is continuous to second region 13a2 and in which the space becomes narrower toward rotation axis A in the direction parallel to rotation axis A of drill 100; and fourth region 13c continuous to third region 13b and continuous to thinning face 6. That is, length L3 of third boundary 33 is larger than length L5 of line segment 35. Accordingly, chipping of the cutting edge, which is likely to occur when cutting, for example, an alloy steel such as SCM415, can be suppressed.

Further, according to drill 100 according to the present embodiment, upper cutting edge 12 may have first upper cutting edge portion 12a continuous to outer circumferential surface 3 and protruding in rotation direction R. This leads to increased strength of first upper cutting edge portion 12a, whereby the cutting edge can be suppressed from being chipped readily. As a result, the durability of the cutting edge can be improved.

Further, according to drill 100 according to the present embodiment, upper cutting edge 12 may have second upper cutting edge portion 12b continuous to first upper cutting edge portion 12a and recessed opposite to rotation direction R. Accordingly, rake face 1 can be suppressed from being worn.

Further, according to drill 100 according to the present embodiment, upper cutting edge 12 may have third upper cutting edge portion 12c continuous to second upper cutting edge portion 12b and fourth region 13c and protruding in rotation direction R. Accordingly, wear of rake face 1 can be suppressed.

Further, according to drill 100 according to the present embodiment, negative land 13 may have chisel edge 9 continuous to third upper cutting edge portion 12c. When viewed in the direction along rotation axis A, the length of chisel edge 9 may be more than or equal to 0.05 mm or may be 0.10 time or less as large as diameter D of the drill. This leads to improved stability upon leading in the workpiece.

Further, according to drill 100 according to the present embodiment, when third boundary 33 represents the boundary between second region 13a2 and third region 13b, length L3 of third boundary 33 may be larger than length L2 of second boundary 32 in the direction parallel to rotation axis A. Accordingly, sharpness of return portion 1b can be improved.

Examples (Preparation of Samples)

First, drills of samples 1 and 2 were prepared. The drill of sample 1 is the drill according to the present embodiment. Specifically, the drill of sample 1 has first region 13a1 in which the space between upper cutting edge 12 and lower cutting edge 11 becomes wider toward outer circumferential surface 3. The drill of sample 1 is a drill according to a comparative example. In the drill of sample 2, the space between upper cutting edge 12 and lower cutting edge 11 does not become wider toward outer circumferential surface 3, i.e., is unchanged. Three drills were prepared for each sample.

(Evaluation Method)

Next, each of the drills of samples 1 and 2 was used to perform a drilling process to a workpiece. The workpiece was SCM440H. A cutting rate (Vc) was set to 100 m/minute. A feed rate (f) was set to 0.2 mm/rotation. For each hole, a blind hole having a depth (h) of 24 mm was formed. The drilling process was performed while externally supplying oil.

Figure 8:
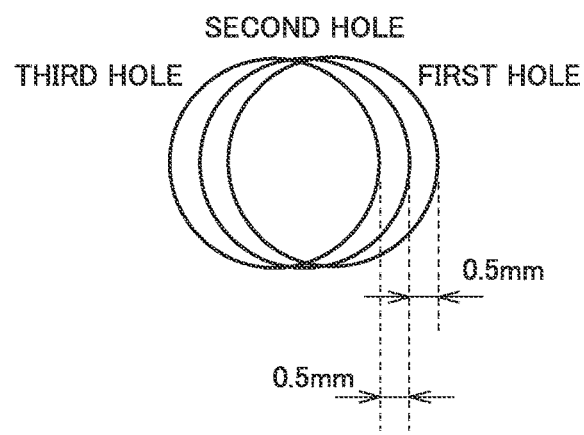
FIG. 8 is a schematic view showing a drilling process method.

FIG. 8 is a schematic view showing a drilling process method. As shown in FIG. 8, the drilling process was performed while shifting locations of the holes in the lateral direction. A pitch in the drilling process was set to 0.5 mm. The cutting was performed only using the outer circumferential cutting edge. Respective strengths of the outer circumferential cutting edges were compared using the number of holes formed until the outer circumferential cutting edges were chipped.

(Evaluation Result)

Figure 9:
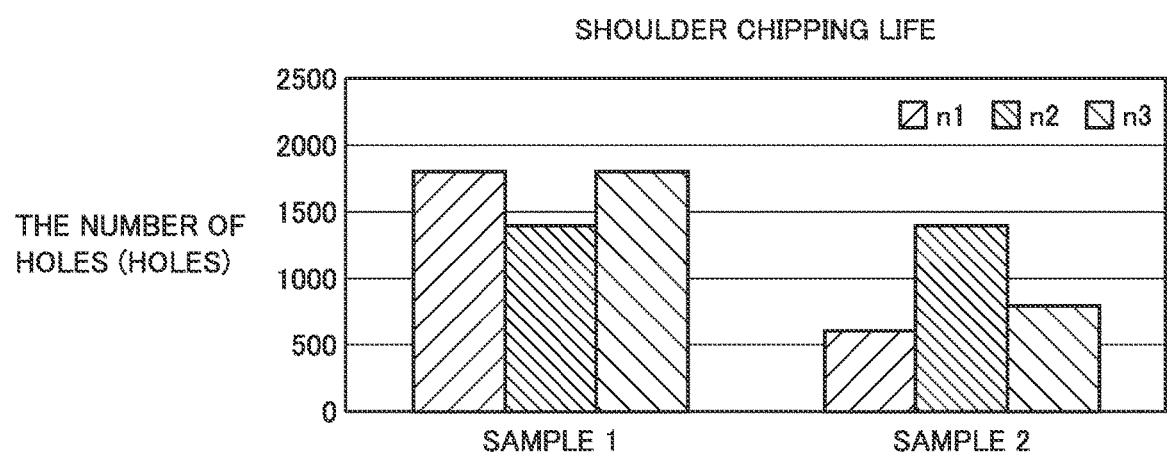
FIG. 9 shows shoulder chipping lives in drills of samples 1 and 2.

FIG. 9 shows a shoulder chipping life in each of the drills of samples 1 and 2. The shoulder chipping life refers to the number of holes formed until the outer circumferential cutting edge is chipped. As shown in FIG. 9, the respective shoulder chipping lives of the drill (n1), drill (n2), and drill (n3) of sample 1 were 1800 holes, 1400 holes, and 1800 holes. That is, the average value of the shoulder chipping lives of the drills of sample 1 was 1667 holes. On the other hand, the respective shoulder chipping lives of the drill (n1), drill (n2), and drill (n3) of sample 2 were 600 holes, 1400 holes, and 800 holes. That is, the average value of the shoulder chipping lives of the drills of sample 2 was 933 holes. From the above result, it was confirmed that the durability of the cutting edge can be improved by using the drill having first region 13a1 in which the space between upper cutting edge 12 and lower cutting edge 11 becomes wider toward outer circumferential surface 3.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: rake face; 1a: return face; 1b: rake face portion; 1c: straight line; 2: flank face; 3: outer circumferential surface; 3b: margin; 4: inclined surface; 5: lubricant supply hole; 6: thinning face; 8: flute portion; 9: chisel edge; 11: lower cutting edge; 11a: first lower cutting edge portion; 11b: second lower cutting edge portion; 11c: third lower cutting edge portion; 12: upper cutting edge; 12a: first upper cutting edge portion; 12b: second upper cutting edge portion; 12c: third upper cutting edge portion; 13: negative land; 13a1: first region; 13a2: second region; 13a: first negative land portion; 13b: second negative land portion (third region); 13c: third negative land portion (fourth region); 21: tip; 22: back end side; 31: first boundary; 32: second boundary; 33: third boundary; 34: fourth boundary; 35: line segment; 100: drill; A: rotation axis; D: diameter; L1, L2, L3, L5, L6: length; L4: width; R: rotation direction; W: space.

The invention claimed is:

1. A drill comprising:
a rake face;
a negative land continuous to the rake face;
a flank face continuous to the negative land; and
an outer circumferential surface continuous to the rake face, the negative land, and the flank face, wherein
a ridgeline between the rake face and the negative land constitutes a lower cutting edge,
a ridgeline between the flank face and the negative land constitutes an upper cutting edge, when viewed in a direction along a rotation axis of the drill, the negative land includes
a first region in which a space between the upper cutting edge and the lower cutting edge becomes wider toward the outer circumferential surface, and
a second region which is continuous to the first region and in which the space becomes wider toward the rotation axis,
in a cross section perpendicular to the rotation axis, the rake face includes a return face continuous to the outer circumferential surface, the return face being recessed opposite to a rotation direction of the drill,
when a first boundary represents a boundary between the outer circumferential surface and the first region and a second boundary represents a boundary between the first region and the second region, a length of the first boundary is larger than a length of the second boundary in a direction parallel to the rotation axis, and
the second boundary is continuous to the return face.

2. The drill according to claim 1, wherein
the negative land includes
a third region which is continuous to the second region and in which the space becomes narrower toward the rotation axis of the drill in the direction parallel to the rotation axis, and
a fourth region continuous to the third region and continuous to a thinning face.

3. The drill according to claim 2, wherein the upper cutting edge has a first upper cutting edge portion continuous to the outer circumferential surface and protruding in the rotation direction.

4. The drill according to claim 3, wherein when viewed in the direction along the rotation axis, the first upper cutting edge portion has a curvature.

5. The drill according to claim 4, wherein when viewed in the direction along the rotation axis, a curvature radius of the first upper cutting edge portion is 0.5 time or less as large as a diameter of the drill.

6. The drill according to claim 3, wherein the upper cutting edge has a second upper cutting edge portion continuous to the first upper cutting edge portion and recessed opposite to the rotation direction.

7. The drill according to claim 6, wherein when viewed in the direction along the rotation axis, the second upper cutting edge portion has a curvature.

8. The drill according to claim 6, wherein the upper cutting edge has a third upper cutting edge portion continuous to the second upper cutting edge portion and the fourth region and protruding in the rotation direction.

9. The drill according to claim 8, wherein when viewed in the direction along the rotation axis, the third upper cutting edge portion has a curvature.

10. The drill according to claim 9, wherein when viewed in the direction along the rotation axis, a curvature radius of the third upper cutting edge portion is 0.2 time or more and 0.35 time or less as large as a diameter of the drill.

11. The drill according to claim 8, wherein when viewed in the direction along the rotation axis, a curvature radius of the second upper cutting edge portion is 1.2 times or more and 1.6 times or less as large as a curvature radius of the third upper cutting edge portion.

12. The drill according to claim 2, wherein when a third boundary represents a boundary between the second region and the third region, a length of the third boundary is larger than a length of the second boundary in the direction parallel to the rotation axis.

13. The drill according to claim 12, wherein
the rake face has a rake face portion continuous to the return face, and
the third boundary is continuous to a fourth boundary, which represents a boundary between the return face and the rake face portion.

14. The drill according to claim 1, wherein in the cross section, a curvature radius of the return face is 0.2 time or more and 0.4 time or less as large as a diameter of the drill.

15. The drill according to claim 1, wherein the lower cutting edge has a first lower cutting edge portion continuous to the outer circumferential surface and protruding in the rotation direction.

* * * * *